(12) United States Patent
Borchardt et al.

(10) Patent No.: US 10,144,367 B2
(45) Date of Patent: Dec. 4, 2018

(54) MOLDED AND SHAPED ACOUSTICAL INSULATING VEHICLE PANEL AND METHOD OF MAKING THE SAME

(75) Inventors: Steven Borchardt, Clemmons, NC (US); Brian Jarrard, Elkin, NC (US)

(73) Assignee: LYDALL, INC., Manchester, CT (US)

( * ) Notice: Subject to any disclaimer, the term of this patent is extended or adjusted under 35 U.S.C. 154(b) by 872 days.

(21) Appl. No.: 12/285,082

(22) Filed: Sep. 29, 2008

(65) Prior Publication Data

US 2009/0085378 A1    Apr. 2, 2009

Related U.S. Application Data

(60) Provisional application No. 60/960,402, filed on Sep. 28, 2007.

(51) Int. Cl.
*B60R 13/08* (2006.01)
*B32B 3/26* (2006.01)
(Continued)

(52) U.S. Cl.
CPC ............ *B60R 13/0861* (2013.01); *B32B 3/26* (2013.01); *B32B 5/06* (2013.01); *B32B 5/14* (2013.01);
(Continued)

(58) Field of Classification Search
CPC .......... D04H 1/005; D04H 1/465; D04H 1/48; D04H 1/54; B60R 13/0815; B60R 13/0861
(Continued)

(56) References Cited

U.S. PATENT DOCUMENTS 1,704,048 A   3/1929  Jordan
3,068,794 A   12/1962 Morris et al.
(Continued)

FOREIGN PATENT DOCUMENTS

JP    06344486 A    12/1994
JP    07186845 A    7/1995
(Continued)

OTHER PUBLICATIONS

Watzl et al., Thermofusion, Thermobonding and Thermofixierung Fuer Nonwovens, vol. 75, No. 10, Oct. 1994. pp. 840-850. XP000471110, ISSN: 0341-0781.
(Continued)

*Primary Examiner* — Jennifer A Steele
(74) *Attorney, Agent, or Firm* — Cantor Colburn LLP (57) ABSTRACT

A molded and shaped acoustical insulating vehicle panel having a dry-laid needled fibrous composite composed of a first portion of about 50 to 80 percent meltable binder fibers and about 20 to 50 percent stable fibers and having a second portion of about 20 to 50 percent meltable binder fibers and 50 to 80 percent of staple fibers. The meltable binder fibers are in a molded and resolidified state such that the resolidified binder fibers of the first portion form a substantially continuous, semi-impervious, densified skin integrally associated with and bonded to a surface of the first portion. The molded composite is in such a heat and pressure molded state that the composite has over a predominance of its area a density of from about 12 to 22 lbs./cubic foot (192 to 352 kg/cubic meter) and the panel is sufficiently rigid as to be self-supporting.

19 Claims, 2 Drawing Sheets

(51) Int. Cl.
  *B32B 5/06* (2006.01)
  *B32B 5/26* (2006.01)
  *D04H 13/00* (2006.01)
  *D04H 1/541* (2012.01)
  *D04H 1/485* (2012.01)
  *D04H 1/558* (2012.01)
  *B32B 5/14* (2006.01)

(52) U.S. Cl.
  CPC ............ *B32B 5/26* (2013.01); *B60R 13/0815* (2013.01); *D04H 1/485* (2013.01); *D04H 1/541* (2013.01); *D04H 1/558* (2013.01); *D04H 13/005* (2013.01); *Y10T 442/667* (2015.04); *Y10T 442/688* (2015.04); *Y10T 442/692* (2015.04)

(58) Field of Classification Search
  USPC ....... 442/402, 403, 405, 407, 362, 364, 382, 442/383, 389; 28/107–109, 111–117; 296/198, 146.1
  See application file for complete search history.

(56) References Cited

U.S. PATENT DOCUMENTS

| | | | |
|---|---|---|---|
| 4,568,581 A | | 2/1986 | Peoples, Jr. |
| 4,594,283 A | * | 6/1986 | Ohigashi ...................... 428/218 |
| 4,620,745 A | | 11/1986 | Jacobs |
| 4,673,207 A | | 6/1987 | Reynolds et al. |
| 4,735,427 A | | 4/1988 | Fuchs et al. |
| 4,801,169 A | | 1/1989 | Queen et al. |
| 5,094,318 A | | 3/1992 | Maeda et al. |
| 6,376,396 B1 | | 4/2002 | Thorn et al. |
| 7,497,509 B2 | | 3/2009 | Omiya et al. |
| 2003/0008581 A1 | * | 1/2003 | Tilton et al. ................... 442/181 |
| 2003/0199216 A1 | * | 10/2003 | Gomez et al. ................. 442/327 |
| 2004/0087236 A1 | * | 5/2004 | Wenstrup ...................... 442/402 |
| 2004/0096646 A1 | | 5/2004 | Behrendt et al. |
| 2005/0176327 A1 | * | 8/2005 | Wenstrup et al. ............ 442/357 |
| 2006/0214474 A1 | * | 9/2006 | Omiya et al. .................. 296/198 |
| 2007/0066176 A1 | * | 3/2007 | Wenstrup et al. ............ 442/415 |

FOREIGN PATENT DOCUMENTS

| | | | | |
|---|---|---|---|---|
| JP | 2001513217 A | | 8/2001 | |
| JP | 200630683 A | | 9/2006 | |
| JP | 2006248284 A | | 9/2006 | |
| JP | 2006306381 | * | 11/2006 | ............ B60R 13/08 |
| WO | WO-03/006303 A1 | | 1/2003 | |
| WO | WO-2006/007276 A1 | | 1/2006 | |
| WO | WO2009042996 A1 | | 4/2009 | |

OTHER PUBLICATIONS

"ASTM C384-98, Standard test method for impedance and absorption of acoustical materials by the impedance tube method", Annual Book of ASTM Standards, Philadelphia, PA, US, vol. 4.06, Jan. 2001, pp. 118-126, XP:008086537, ISSN: 0192-2998.

Office Action issued in Canadian Patent Application No. 2,702,236, dated Aug. 1, 2012; 2 pages.

"Bestimmung der Biegeeigenschaften, EN ISO 178", Jan. 1, 1996, DIN Deutsches Institut fur Normung e.V., XP55029995, (with English Abstract); 6 pages.

Office Action issued in European Application No. 08833799.3-2124, dated Jun. 27, 2012; 6 pages.

First Office Action issued in Chinese Patent Application No. 200880116997.X, dated Feb. 29, 2012; 4 pages.

Notification of the First Office Action (PCT Application in the National Phase) and English Translation of Text Portion of Office Action, issued in Chinese Patent Application No. 200880116997.X dated Feb. 29, 2012; 5 pages.

Office Action and English Translation of Office Action, issued in Japanese Patent Application No. 2010-527233, dated Mar. 12, 2013; 5 pages.

Office Action for European Application No. 08833799.3-2124 dated Sep. 29, 2011; 5 pages.

International Search Report for Appliction No. PCT/US2008/078108; 3 pages.

Written Opinion of the International Searching Authority for Application No. PCT/US2008/078108; 7 pages.

Office Action issued in Canadian Patent Application No. 2,702,236 dated Jul. 2, 2013; 2 pages.

Response to Office Action Filed in the Canadian Patent Application No. 2,702,236 dated Aug. 1, 2013; 2 pages.

\* cited by examiner

MOLDED AND SHAPED ACOUSTICAL INSULATING VEHICLE PANEL AND METHOD OF MAKING THE SAME

CROSS-REFERENCE TO RELATED APPLICATIONS

This nonprovisional application claims priority under 35 U.S.C. § 119(e) on U.S. Provisional Application No. 60/960,402, filed on Sep. 28, 2007, the entirety of which is incorporated herein by reference.

BACKGROUND OF THE INVENTION

1. Field of the Invention

The present invention relates to a molded and shaped insulating vehicle panel, particularly to such a panel that is acoustically insulating, and to a method for making that panel. More particularly, the present invention is directed to such panels that are used in assembling automobile and truck vehicles, such as door panels, roof panels, backlight panels and wheel wells, and especially the latter.

2. Description of Background Art

There has been a continued effort in the art to reduce the cost and weight of motor vehicles. A large part of the cost and weight is that of the metal parts used in the construction, e.g., body parts, protective and acoustical panels, and the like. While the present invention is widely applicable to vehicle panels, the present invention can be best illustrated by specific reference to automobile and truck wheel well shields. These shields are positioned underneath the wheel well of the vehicle and block splashed water and road debris from entering the vehicle underbody or engine compartment. Wheel well shields are a particularly difficult problem in the art, since these shields must not only prevent substantial egress of splashed water from the road into the underbody or engine compartment, but in order to be fully satisfactory must abate road noises occasioned by debris being spun by the tires into the wheel well. Of notable example of such noise is when an automobile traverses a gravel road, gravel is spun into the wheel wells by the tires and makes a very objectionable noise when the wells are unprotected or protected by shields that do not sufficiently acoustically abate that noise.

Traditional solutions for providing protection around the wheel well of a vehicle utilize stamped steel, and the like. These types of solutions were very effective in providing physical protection to the engine compartment and body structures, but were not effective in reducing vehicle noise levels. Additionally, due to the high stiffness and low damping properties, these shields generate unwanted noise in many situations where debris or water impact the shield and excite the structure so as to cause vibrations. These unwanted noises often result in ringing or panging sounds as water splashes or road debris impacts the shield.

There have been improvements on these traditional systems by applying damping coatings to the wheel well or shield or by using materials with lower mechanical stiffness. One such material that is commonly used today is polypropylene. This material can be molded into complex three dimensional shapes through compression or injection molding. The molded polypropylene shields provide weight savings over stamped metal and offer some improvement in acoustics through lower stiffness and higher internal damping properties. However, they do not meet current demands for noise abatement.

In this latter regard, an early effort for such noise abatement is disclosed in U.S. Pat. No. 1,704,048, which proposes applying a thin rubber shape to underneath a fender, which shape is impervious to water, and by way of its elasticity deadens road noise such as gravel. On the other hand, U.S. Pat. No. 3,068,794 proposes fender boots, which are placed inside of the wheel well. The fender boots are made of a plastic material to abate road noises.

In a more recent approach, U.S. Pat. No. 4,620,745 describes wheel well protectors having semi-resilient material for noise abatement. U.S. Pat. No. 4,735,427 goes even further toward modern applications in that it proposes a shell of plastic material contoured approximately to the contour of the wheel well. Preferably, the plastic material is a needled plastic fiber fleece material that is produced from sheet material by warm working to the contours of the wheel well, and is secured to the wheel well by adhesion, gripping screws, and the like. An alternative in this protective device is where, for special sound insulation, the fleece material can be made impermeable to water on its front side by use of elastic plastic material. This is, essentially, the approach most currently used in the background art.

However, as a more advanced approach, U.S. Patent Application Publication No. 2004/0096646A1 proposes a light weight wheel shield made of plastic for the reduction of rolling noises, sprayed water noises, and stone impact noises by use of foamed or expanded plastic. That publication also references various attempts at wheel well shields and points out that the expanded plastic wheel well shield of the invention is surprisingly stable in shape and has excellent acoustical properties, as well as being light weight. The wheel well shield can be produced by injection molding or deep drawing. This more modern approach in the background art is significant in that it recognizes the need to make the wheel well shield as light weight as possible, while providing good sound abatement.

It is therefore quite clear that successful wheel well shields depend on the particulars of the material from which the shield is made, especially in regard to noise abatement. In this latter regard, U.S. Pat. No. 5,094,318 proposes a sound absorption material for automobiles, which is a combination of layers with a dampening sheet therein. U.S. Pat. No. 4,801,169, which is particularly directed to a trunk liner, makes clear the importance of the vehicle panel being self-supporting, since the self-supporting nature can facilitate application and fastening of the panel to the vehicle. In particular, that patent suggests a molded trunk liner formed of fibrous material, such as polyester staple fibers that have been needle punched with a moldable coating applied to a backside of the liner to provide shape retention and stiffness. Coatings of polyethylene or moldable latex are suggested. U.S. Pat. No. 4,673,207 discloses a similar trunk liner where the panels are biased inwardly toward an upright position when mounted in the trunk to facilitate mounting. U.S. Pat. No. 4,568,581 is similar but proposes the use of molded panels for trunk compartments comprising a non-woven web formed of a blend of relatively high melting fibers and relatively low melting thermoplastic fibers where the low melting fibers form a multiplicity of bonds imparting shape retention and on one surface a fused form.

Recently, a substantial advance in the art in acoustical insulation has been proposed in U.S. Patent Application Publication No. 2003/0199216A1, assigned to the present Assignees. That application points out that acoustical insulation, especially for vehicle panels, generally has low x-y plane strength unless they are of substantial thicknesses or composed of multi-layers, one of which is a strength producing layer. However, most applications for automobile acoustical insulation must be contained in relatively small spaces, and generally must be one inch or less in thickness. This is true for automobile panels, and is also true for wheel well shields. That application proposes a gradient density material made of a single layer of non-woven material which has been processed such that at least a portion of the thickness has a density increase with respect to the remaining portions of the thickness, and the single layer material, after processing, has an air flow resistance in the range of 200 to 4000 MKS rayls, which, as disclosed in that application, is the range necessary for good acoustical abatement. This is a substantial advantage in the art, and the publication is incorporated herein by reference.

Thus, it is clear that the art has long sought to provide better vehicle panels that have substantial acoustical abatement and, especially, such panels that are also self-supporting. The present invention is directed to providing specific panels of that nature but which can be produced at a relatively low cost and with high acoustical abatement.

SUMMARY OF THE INVENTION

The present invention is based on several primary and subsidiary discoveries.

First of all, in order to produce a relatively inexpensive and improved panel, it was found that an improved panel could be made by a relatively inexpensive dry-laid process. Further, it was found that such a panel could be made without the necessity of providing to the panel a strengthening layer, liquid coatings, resin impregnation or lamination. This substantially reduces the cost of the improved panel as compared with usual commercial automobile panels, and is a major feature of the present invention. Instead, the present inventors found that by using a combination of high melting staple fibers blended with low melting binder fibers in a needled and molded state, an improved panel could be produced without the addition of such coatings, resins or laminations. This results in a very less expensive, but improved, panel.

Secondly, and very importantly, it was found that the panel could be molded in such a manner so as to inherently provide a densified, semi-impervious surface (referred to as a "skin"), that is intimately and integrally associated with and bonded to a surface of the panel so as to provide water splash protection and increased road hazard protection, while also contributing to the panel being self-supporting and acoustically active. This is a very important feature of the present invention.

Thirdly, it was found that a reduction in thickness of the panel during processing may provide increased sound abatement. That reduction in thickness results in a higher density of the final product so as to maximize the product bending stiffness and provide effective acoustic impedance to reduce unwanted noise transmission. In order to achieve these properties it was found that the final product density should be from about 12 to 22 lbs/cubic foot (192 to 352 kg/cubic meter). This density increase and the produced "skin" provide higher acoustic impedance by creating a more tortuous path for sound waves to travel through the material. This density increase, along with the integral durable skin, results in a flow resistance of the composite from about 300 to 1000 MKS rayls, preferably 350 to 800 MKS rayls. The "skin' is a high density portion on the outer surface of a first portion, explained in detail below, and has a density of at least two, or more preferably four, and even ten times and up to 50 times the overall final product density, with the skin being from about 5% to about 20% of the overall thickness of the molded panel. The "skin" is a softened and/or melted surface of a first portion that has been resolidified and which is semi-impervious to water, as explained in more detail below.

It was also found that the panel could be produced by a relatively critical combination of meltable binder fibers and staple fibers in a first portion of the material along with a different blend of meltable fibers and staple fibers in the second portion of the material.

It was further found that that first portion should have about 50 to 80 percent meltable binder fibers and about 20 to 50 percent staple fibers, with the second portion having about 20 to 50 percent meltable binder fibers and about 50 to 80 percent staple fibers.

This composite of fibers is then needled sufficiently to form a consolidated composite. The usual needling creates a finished overall density gradient from the back side to the skin side of about 1:2 to 1:10. The consolidated composite is heated to a temperature sufficient to soften and/or melt the meltable binder fibers such that the meltable fibers are moldable. That heated and consolidated composite is molded in a configuration of the vehicle panel until the meltable binder fibers are softened and/or melted and then resolidified, such that the resolidified binder fibers of the first portion of the composite form a substantially continuous, semi-impervious, densified skin intimately adhered to, integrally associated with, and bonded to the surface of the first portion, and wherein the two portions have, over a predominance of the area of the panel, a density of about 6 to 30 lbs/cubic foot (96 to 481 kg/cubic meter), and most preferably, 12 to 22 lbs/cubic foot (192 to 352 kg/cubic meter).

Figure 6:
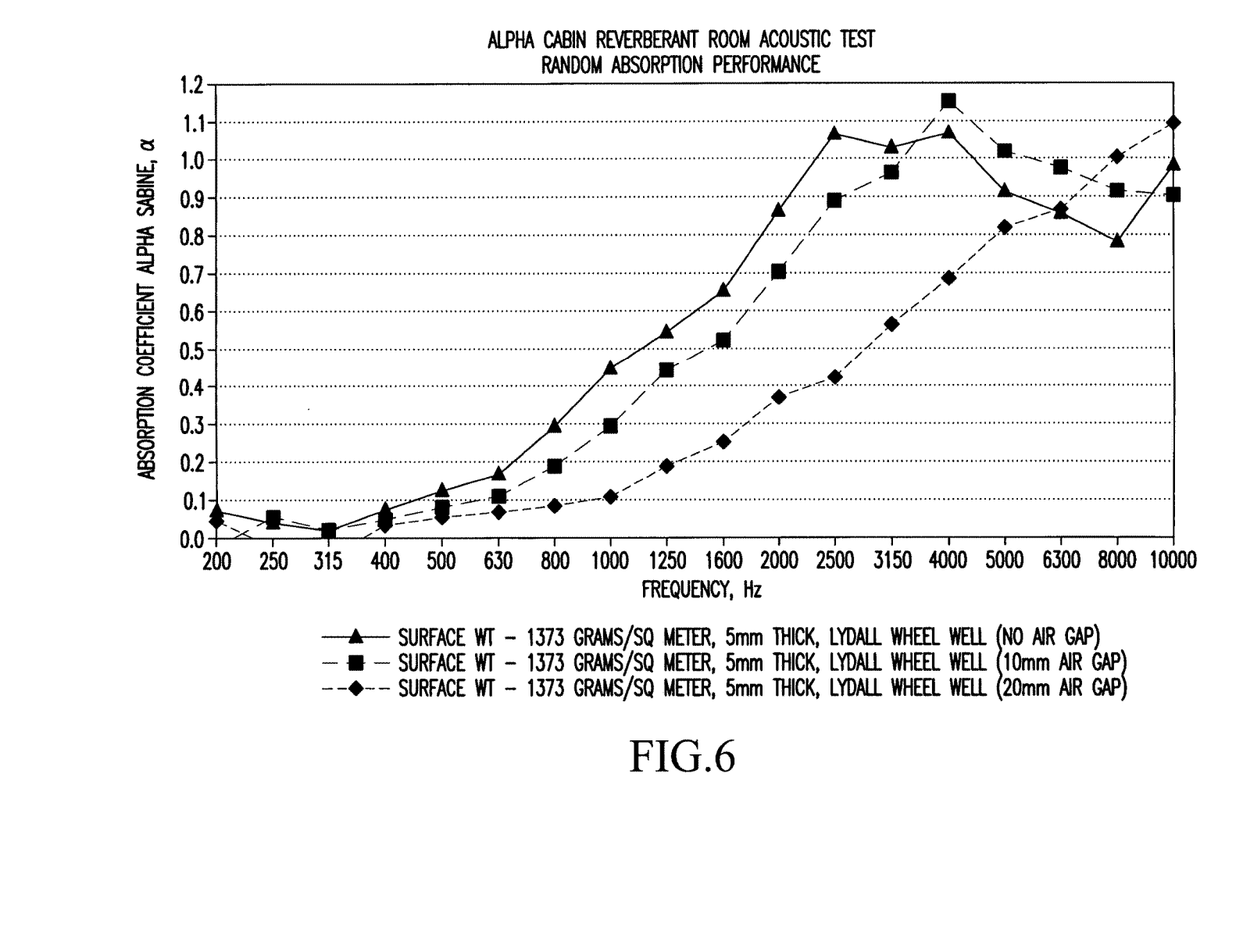
FIG. 6 is a graphical presentation of the Absorption of panels spaced from supports, as briefly noted above.

This nonwoven, composite, molded and shaped acoustical insulating vehicle panel, made by a dry-laid process, not only provides substantial abatement of the acoustical noise, but is also self-supporting, which greatly facilitates movement and attachment of the panel during vehicle assembly, and is relatively inexpensive. The self-supporting nature of the panel also provides additional significant advantages in final applications of the panel to specific parts of the automobile, and especially to wheel wells. One important advantage of the present panel is that it does not require a similarly shaped support structure in the wheel well. In other words, the typical metal wheel well is not needed, since the present panel is sufficiently rigid to eliminate the necessity of a metal wheel well. This can aid vehicle manufacturers in minimizing the number of components used on a particular model. This can also result in substantial weight and cost reductions. Further, the self supporting feature of the present panel can be used to improve acoustical performance in applications where a body support structure is present. The molded shape of the panel can be designed such that specific air gaps are present in relation to a support structure behind the molded panel. These air gaps, combined with the acoustical impedance of the panel, provide further improvement in airborne acoustic absorption properties. This is demonstrated in FIG. 6 by the acoustical absorption in that such absorption will show significant improvement in the absorption performance in the low to mid frequency ranges of about 250 to 2500 Hz as the panel is spaced away from the support structure with air gaps of 0, 10 and 20 mm.

Thus, broadly stated, the present invention provides a molded and shaped acoustical insulating vehicle panel. The panel comprises a dry-laid and needled fibrous composite having a first portion of about 50 to 80 percent meltable binder fibers and about 20 to 50 percent staple fibers, and having the second portion about 20 to 50 percent meltable binder fibers and about 50 to 80 percent staple fibers, all on a weight basis. A portion of the meltable binder fibers are in a molded and resolidified state such that the resolidified binder fibers on the first portion form a substantially continuous, semi-impervious, densified skin integrally associated with and bonded to a surface of the first portion. The molded composite is in such a heat and pressure molded state that the two portions have, over a predominance of their area, a density of about 12 to 22 lbs/cubic foot (192 to 352 kg/cubic meter), and wherein the molded panel is sufficiently rigid so as to be self-supporting.

There is also provided a process for making the vehicle panel as described above, by dry-laying a first portion of fibers having from about 50 percent to 80 percent meltable binder fibers and about 20 percent to 50 percent staple fibers. A second portion of the fibers is dry-laid onto the first portion so as to form a composite thereof, with the second portion having about 20 to 50 percent meltable binder fibers and about 50 to 80 percent staple fibers, all on a weight basis. The composite is needled sufficiently to form a consolidated composite. The consolidated composite is heated to a temperature sufficient to soften and/or melt the meltable binder fibers such that the meltable binder fibers are moldable. The heated consolidated composite is then molded in a mold into a configuration of a vehicle panel, e.g. a wheel well shield, until the meltable binder fibers resolidify. At least some of the resolidified binder fibers of the first portion form a substantially continuous, semi-impervious, densified skin intimately adhered and bonded to the first portion, and wherein the two portions have, over a predominance of their area, an insulation density of about 12 to 22 lbs/cubic foot (192 to 352 kg/cubic meter), whereby the molded panel is sufficiently rigid so as to be self-supporting.

DETAILED DESCRIPTION OF THE INVENTION

Figure 3:
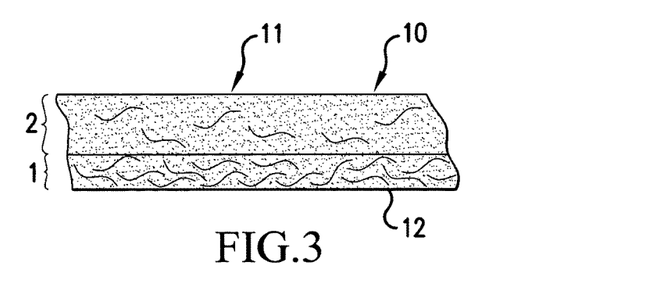
FIG. 3 is a diagrammatic idealized cross sectional side view of a dry-laid and needled composite according to an embodiment of the present invention.

As can best be seen from FIG. 3, the panel of the present invention is generally composed of a first portion 1 and a second portion 2. The first portion 1 has from about 50 percent to about 80 percent meltable binder fibers and about 20 to 50 percent staple fibers. In this regard, the term "meltable binder fibers" refers to fibers that will soften and/or melt, at a selected molding temperature, sufficiently that the fibers, when cooled, will resolidify into the "skin," as further describe below. "Staple fibers" refer to fibers that do not sufficiently soften and/or melt, at the selected molding temperature, so as to substantially participate in the resolidified formation of the "skin," i.e. staple fibers will be in the skin but not in a resolidified form. The meltable binder fibers and the staple fibers may or may not be of the same chemical designation, e.g. polyester fibers. They will; however, be of different softening and/or melting temperatures. The term "skin" refers to a portion of fibers at the surface of the first portion 1, after molding that contains resolidified binder fibers attached to themselves and staple fibers contained in the skin. This combination of resolidified binder fibers and staple fibers results in a semi-impervious (to water) portion such that the skin will allow splashed water in the molded panel to drain from or evaporate from the molded panel, while at the same time will not allow splashed water unimpeded transmission through the panel and into the engine compartment or body structure, which would be most undesirable. The noise abatement is adversely affected if the skin is not semi-impervious and the present semi-impervious nature (defined by the resistance) allows splashed water that enters the panel to drain and evaporate from the panel, so as to return to the most acoustical favored condition of a dry panel.

In FIG. 3, the first portion 1 is shown as being made from one layer of carded fibers and the second portion 2 is shown as being made from one layer of carded fibers. The two layers are needeled together to form the composite 10 in FIG. 3. The first portion 1 and the second portion 2 can be needled to each other from at least one side so that fibers from the first portion extend into the second portion such as to provide a high bond strength between the first portion and the second portion after molding to prevent peeling of the first portion from the second portion after molding. In other words, the combination of needling of the first and second portion to each other with the subsequent step of molding the composite 10 provides a molded product having binder fibers from the first portion 1 adhered to binder fibers of the second portion 2. In addition, due to the needling, fibers from the first portion extend into the second portion, resulting in increased bond strength. It should also be noted that the first portion 1 and second portion 2 can be needled separately and then needled together in a further step to further increase the bond strength within the first and between the first and second portions.

Figures 4, 5:
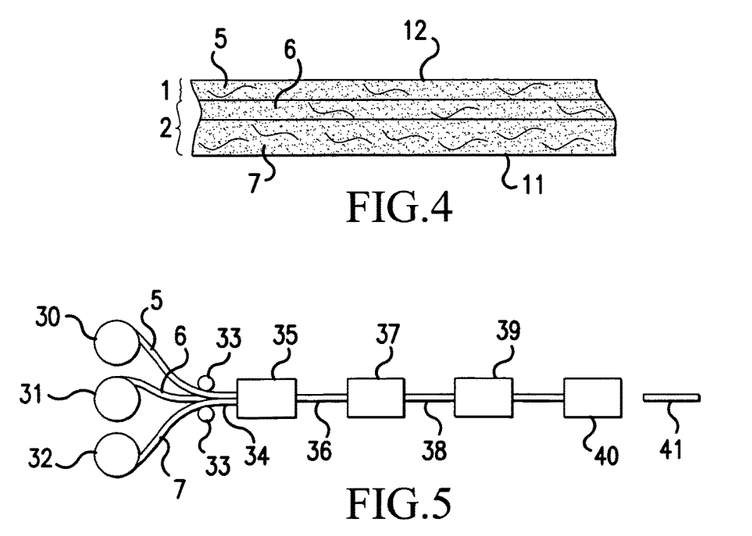
FIG. 4 is a diagrammatic idealized cross section of a dry-laid and needled composite according to another embodiment of the present invention.
FIG. 5 is a diagrammatic illustration of the process of the present invention.

In FIG. 4, the first portion 1 is shown as layer 5, as will be explained below, in a preferred form of the present invention. The first portion 1 is made by use of one carded layer 5, and the second portion 2 is made by way of a second carded layer 6 and a third carded layer 7, all, most preferably, being cross-lapped. However, the reverse of this may be used, i.e. the first portion 1 could be made with two carded layers and the second portion could be made with one carded layer. For sake of conciseness; however, only the first of these two embodiments will be discussed in detail.

In the embodiment of FIG. 4, for example, the first carded layer 5 may contain 30% black staple fibers and 70% premium, high grade black meltable fibers. The second carded layer 6 may contain 60% black staple fibers and 40% white meltable fibers. The third carded layer may contain 80% black staple fibers and 20% white meltable fibers. The significance of the colors will be explained below.

Irrespective of the exact carded layers, the carded composite should have about 50 percent to 80 percent meltable binder fibers and about 20 to 50 percent staple fibers in the first portion 1, especially, 60-70 percent meltable binder fibers and 25 percent to 45 percent staple fibers. The second portion 2 should have 50 to 80 percent staple fibers, especially, 60-70% staple fibers, and 20 to 50 percent meltable binder fibers, especially 25-45%. After the layers are carded onto each other to form a composite of the fibers, the composite is needled sufficiently to form a consolidated composite, generally 10, as shown in FIG. 3. The intermingling caused by the needling is necessary to achieve the semi-impervious skin and self-supporting features of the present invention, but the intermingling is not complete. Thus, after needling there will be a substantially greater proportion of binder fibers at or near the surface 12 of the needled composite 10 than towards the backside 11 thereof. This, after molding, provides a density gradient, with increasing density from backside 11 to surface 12. The density gradient contributes to the self-supporting feature and, also, substantially affects the frequencies of noise abatement achieved by the panel.

While any dry-laying method may be used, such as air-laying, sputtering, spinning and the like, it is most convenient to air-lay by use of cards, as noted above. Thus the process, as diagrammatically shown in FIG. 5, a preferred embodiment, uses at least three cards 30, 31, and 32 to deposit corresponding layers 5, 6 and 7. Those layers, in a conventional manner, are compressed by rolls 33 into a composite 34 thereof. The composite 34 is needled sufficiently in needling station 35 to form a consolidated composite 36. The consolidated composite 36 is then heated in a heating device 37, e.g., ovens, IR lamps, etc. to a temperature sufficient to soften and/or melt the meltable binder fibers such that the meltable binder fibers are moldable. In a preferred form of the present invention, after this heating, the consolidated composite is then passed to a molding device 39 which molds the heated composite into a desired paneled configuration. If desired, the composite may be cut into convenient lengths before heating, after heating or during or after molding. Thereafter, the molded pieces are allowed to cool at cooling station 40 and the finished molded piece 41 is thus produced.

Figure 1:
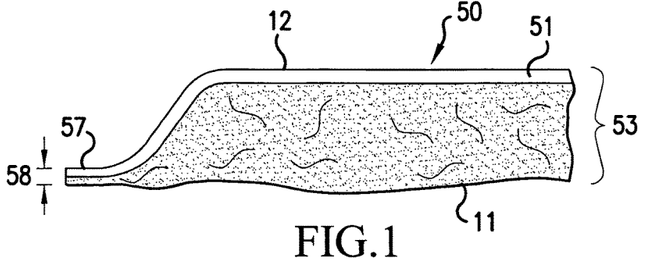
FIG. 1 is a diagrammatic idealized cut away side view of a molded and shaped acoustical insulating vehicle panel of the present invention.

FIG. 1 is a highly idealized diagrammatic illustration of a molded panel. It will be noted that the molded panel, generally 50, is actually a composite, nonwoven, molded and shaped panel that is formed from the composite of either FIG. 3 or FIG. 4. The molding ability is dependent upon the amount of stretch that can be put into the composite without rupturing the skin layer 51 or tearing the composite during the molding process. In order for the skin layer 51 to remain durable, so as to be able to produce a panel without wrinkles, capable of deep draws and without wrinkles in the molded panel, as well as to obtain good aesthetics, the composite should be stretchable to a considerable extent, i.e. have an elongation of at least 75%, and more preferably 120% or even 200%, as determined by ASTM D5034 percent strain at maximum load. Such stretch allows molding into complex shapes, while maintaining durability and an inherent self-supporting nature. The degree and type of needling is largely responsible for determining the maximum percent strain that may be achieved by the composite. It should be noted that the skin layer 51 is formed by the first portion 1 of FIG. 3 or FIG. 4 after molding.

The specific needling not only affects the overall density gradient, but as well affects the internal strength of the composite, since higher needling produces more fiber entanglement within and between layers, which leads to greater entangled strength and greater thermal bonding by the meltable fibers. Higher internal strength reduces the chance of layer separation from environmental stresses in a wheel well with accompanying increased durability and life cycle of the panel.

When the panel, produced as described above and in the form of a vehicle wheel well shield, the shield, desirably, has a bending stiffness of between about 10 lbf/in and 18 lbf/in (17.5 N/cm and 31.5 N/cm), and an ASTM Flow Resistance of between about 300 to 1000 MKS rayls, preferably 350 to 800 MKS rayls. The bending stiffness is measured on a Three Point Bending apparatus coupled to a CRT machine (Instron or equivalent). The crosshead speed should be about 0.5 inches per minute (12.7 mm per minute), with a span of 1.89 inches (48 mm). The width of the sample should be about 2 times the span. The bending stiffness is calculated from the slope, pounds force per inch (Newton's per centimeter) deflection.

As noted above, the panel may be produced by using three cards to produce three layers 5, 6, and 7. During needling, the layers are substantially intermingled, although the top surface 12 of the needled composite, as well as the molded panel, has a much higher ratio of meltable binder fibers to staple fibers than the remainder of the needled composite. This increases the overall density gradient, and while the needling intermingles the fibers, the intermingling is not complete. The panel has a densified skin 51 that is integrally entangled and bonded to the second portion 2, which portion is, as noted above, somewhat intermingled with the fibers of the first portion 2 during the needling. The meltable binder fibers, as described above, have been heated to a temperature sufficient to soften or melt the fibers such that the meltable binder fibers are moldable. When the heated composite is placed in a mold (heated or unheated), the mold configures the panel such that there is an insulation density that will be significant in producing a structurally self-supporting shape, e.g., 12 to 22 lbs./cubic inch (192 to 352 kg/cubic meter). It has been found that a reduction in thickness is not only useful in rendering the molded panel self-supporting, but also is instrumental in achieving an improved sound abatement. However, if the molded thickness is reduced too much, the acoustical properties will be substantially reduced. The reduction in thickness is controlled by the fixed gap in the molding tool. The only additional requirement to achieving the desired thickness is that the material must be thicker prior to molding than after molding. In a preferred embodiment, it this regard, the needled composite is heated to a temperature of at least 300° F. (148.9° C.), and up to 450° F. (232.2° C.), but more preferably, between about 320° F. (160° C.) and 380° F. (193.3° C.). These temperatures will be sufficient for the meltable fibers to either soften or melt so that they may resolidify, upon cooling, into the continuous semi-impervious, densified skin 51 (see FIG. 1). Further, to ensure this reduction and to ensure the semi-impervious densified skin, it is far preferable that the heated composite be molded in a cool mold. The cool mold will cause the melted and/or softened fibers to coalesce into a skin rather rapidly, and that rapid coalescing will prevent total lateral flow of the melted fibrous material, which would result, undesirably, in a skin that is not semi-impervious. A cold mold can be less than 200° F. (93.3° C.), but more preferably the mold temperature will be between about room temperature and 100° F. (37.8° F.).

From the above description it can be seen that it is necessary to have substantial numbers of binder fibers near the surface that will form the semi-impervious skin. To help create this skin, it is desirable to densify the skin surface by increasing the needle density on that side of the composite. It is preferable that surface 12 (in FIG. 3) that is to have the skin have a needle density of 300 to 600, e.g., about 500 needle punches per square inch (about 77 needle punches per square centimeter). On the back side (surface 11 in FIG. 3), it is preferable to have a softer, less dense surface so that it will fill the majority of the thickness of the mold. A needle density of 0 to 110 punches per square inch (0 to 17 punches per square centimeter) on the back side is preferred, and this lower needling also affects the overall density gradient. For sake of aesthetics, it is also important to reduce the penetration of the needles, so that a significant amount of fibers from the second portion are not pushed through to the first portion of the composite. It will also be easily seen that excessive needling could so mix the fibers of the layers, e.g. 5, 6, and 7 (see FIG. 4), that the needled composite 10 (see FIG. 3) does not have a gradation of the meltable fibers with a greater concentration near the surface 12 from which the skin is to be formed or a significant overall density gradient. Of course, the number of needle punches required to form the consolidated composite, and without unduly removing binder fibers from the surface at which the skin is to be formed, will depend upon the weights of the composite.

In this regard, it is much preferred that the first portion 1 (see FIG. 3) has a weight of about 4 to 12 ounces per square yard (136 to 407 grams per square meter) and the second portion 2 has a weight of about 20 to 35 ounces per square yard (678 to 1187 grams per square meter). This will ensure that the panel has the correct thicknesses when produced. However, the thicknesses, again, will depend somewhat on the needling, and the needling may be from only one side or both sides of the composite, as noted above. However, if the needling is from both sides of the composite, then the needle punches per square inch should be towards the lower amounts of the above range. It is necessary, however, that some substantial intermingling of the fibers of layers 5, 6 and 7 (see FIG. 3) occur. And to that end, it is preferred that the needling is with aggressive needles, and at least in part tri-lobal needles which are quite aggressive.

Further, as will be easily appreciated, the needling will depend, in-part, on the fibers used in the composite. While the fibers may be any desired blend of staple fibers and binder fibers, such as nylon, rayon, PVC, polyolefin and polyester, natural and inorganic fibers, the more conventional polyester fibers are preferred. The meltable fibers may be individual fibers or a part of bi-component fibers. Both the meltable binder fibers and the staple fibers should have deniers of between about 2 and 15, and the staple fibers should have staple lengths of between about 1 and 3 inches. The meltable binder fibers may or may not be of those dimensions, but the staple fibers desirably have those dimensions in order to achieve the degree and type of needling required for the mixing of the fibers and self-supporting feature.

When the panel is formed according to the above, and in the form of a vehicle wheel well shield, the shield should have a bending stiffness between about 5 lbf/in and 20 lbf/in (8.75 N/cm and 35.0 N/cm), but especially between about 10 and 18 lbf/in (17.5 N/cm and 31.5 N/cm), and a Flow Resistance between about 300 to 1000 MKS rayls, preferably 350 to 800 MKS rayls.

Such a panel will substantially abate road noises through the well of the vehicle, and especially noise created in the frequency ranges created by the contact and interaction between the tire and the road. This is true even when the panel is spaced away from support structures required in particular applications of the shields.

An important point of wheel well shields is that they must be relatively inexpensive. Otherwise, the expense will not allow commercial use thereof. In addition, vehicle manufacturers, largely by tradition, require that most vehicle panels have a black surface and/or a grey undersurface. These colors are compatible with most all vehicle body colors. However, for example, black polyester binder fibers are generally higher in cost than white fibers due to their limited commercial use in industry. White binder fibers are generally the least expensive meltable fibers. Recent growth in the availability and production volumes of black polyester staple fibers has driven the price of these fibers to a comparable level with white polyester staple fibers. In order to achieve the desired aesthetic properties, it was found that a blend of black polyester binder fibers and black polyester staple fibers could be used for the first portion of the composite. This provides a desirable solid black surface which hides contamination (dirt, etc.) on the panel surface and is compatible with most vehicle body colors. It was also found that a blend of black polyester staple fibers and white polyester binder fibers could be used for the second portion of the composite to produce a grey backside surface color. Black fiber blends are more expensive than the combination of white and black fibers. Thus, this blend of fibers is advantageous for the second portion, as the white binder fibers blend reduces the cost of the materials and, thus, the finished panel.

Figure 2:
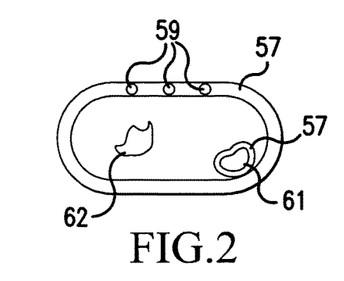
FIG. 2 is a diagrammatic idealized top view of a panel of the present invention.

The panel will also have attachment areas 57 (see FIG. 1) which have an attachment thickness 58 that is about 0.3 to 0.7 times the insulating thickness 53. This produces a component with higher density areas around the attachment points, which results in higher physical strength in these areas. This higher physical strength relates to the tensile and tear strength properties of the composite. These higher strength properties can be advantageous in final application as they decrease the possibility of separation or tearing around the fastener head. In FIG. 2, the attachment area 57 is illustrated as extending around an entire circumference of the part, and three attachment holes 59 are illustrated to receive fasteners (not shown). However, the increased density is only necessary directly adjacent to the fastener positions (for example, the holes 59 in FIG. 2), and should cover a small portion of the entire part area. This is normally less then 10 percent of the total part surface area. Also in FIG. 2, there is illustrated a hole 61 with an attachment area 57 illustrated surrounding the hole 61. The attachment area 57 in this case does not have an attachment hole, but is an increased density portion around the hole in order to provide strength at this location. Any number of elements could extend through the hole 61, including struts, bolts, etc. Also illustrated in FIG. 2 is a protuberance 62, which is simply an outwardly curved portion, which would be provided only if necessary to conform structure on which the part is mounted.

Of course, the increased density areas and the protuberances are not required for the present invention and only represent one potential improvement for certain applications. The composition of the material and the assembly method are that which makes it structurally self-supporting.

While the present invention has been specifically illustrated by the use of three cards, the present invention may be carried out by use of only one card, which cards the fibers in the first portion 1 of the composite. This carded layer is then needle punched into a nonwoven composite that can be wound into a roll or otherwise stored for further processing. The carded and needle punched first portion 1 may then be introduced into the card for a second pass to card the fibers for the second portion 2 of the composite. The second portion can be formed in one layer as in FIG. 3 or in two layers (two passes through the card) as in FIG. 4. In any event, the composite may then be needle punched into the final composite, as described previously.

In some cases, additional layers beyond layers 5, 6 and 7 may be used for adding other functionality to the panel, e.g., fire retardance.

With the above invention, the panel is so self-supporting that it may be installed in a well above a tire without the need of additional wheel well shaped inserts from molded plastic or stamped metal. The panel is sufficiently stiff, when it has a bending stiffness of at least 6 pound force per inch (10.5 N/cm), more preferably 10 pound force per inch (17.5 N/cm), that it may bridge all the gaps between the fasteners. It may also be picked up and maneuvered into an attachment position, for example, in a wheel well and attached to the well without the panel deflecting substantially or at least any deflection is not sufficient as to cause a difficulty in making that attachment by the vehicle assembler. This provides a very important advantage to the present invention.

EXAMPLES

In this first example, a specific example of a three-layer product that utilizes three individual carding machines will be described in detail.

The first layer is composed of 2 different polyester fibers. The predominant fiber is a black polyester bicomponent with a sheath melting point of about 230° F. (110° C.). This fiber is 70% of the blend ratio. The second fiber in the first layer is a black polyester staple, and it is 30% of the blend. The two fibers are mixed to the above ratio by weight and then thoroughly opened and blended and introduced into a carding machine. The card produces a web that is carried by the cross-lapper which creates horizontal laps of the carded web. The number of horizontal laps is set so the total weight of the first layer is 7.0 ounces per square yard (237 grams per square meter) in the final needled composite. The first portion of the present invention is comprised entirely of the first carded layer.

The second carded layer is composed of 2 different polyester fibers. The predominant fiber in the second layer is a black polyester staple fiber, and it is 60% of the blend ratio. The second fiber in the second layer is a white polyester bicomponent with a sheath melting point of about 356° F. (180° C.), and it is 40% of the blend ratio. This fiber blend is processed through a similar carding operation as the first layer to produce a web with total weight of 17.2 ounces per square yard (583 grams per square meter) in the final needled composite for the second layer. The second layer is processed on top of the first carded layer to form a composite fibrous batt.

The third carded layer is composed of 2 different polyester fibers. The predominant fiber in the third layer is a black polyester staple fiber, and it is 80% of the blend ratio. The second fiber in the third layer is a white polyester bicomponent with a sheath melting point of about 356° F. (180° C.), and it is 20% of the blend ratio. This fiber blend is processed through a similar carding operation as the first layer to produce a web with total weight of 17.2 ounces per square yard (583 grams per square meter) in the final needled composite for the third layer. This third layer is processed on top of the first and second carded layers to form a composite fibrous batt.

Between the 2nd and 3rd carded layers, a carrier fabric is added as a processing aid. The carrier fabric is known in the non-wovens industry as spun-bond polyester. The weight of this carrier fabric is 0.59 ounces per square yard (20 grams per square meter). The purpose of this carrier is to stabilize the 3 layers prior to and during processing through the needle loom.

The three individual carded and cross-lapped layers along with the carrier fabric are compressed between rollers and fed into a needle loom. The needle loom mechanically entangles all three layers and produces stitches that entangle the fibers and lock the layers together by needling from both the top and bottom surfaces. The top needling section provides a needle density of 212 punches per square inch (33 punches per square centimeter). The bottom needling section of the needle loom provides a needle density of 423 punches per square inch (66 punches per square centimeter). The needle density of the bottom section is significantly greater to sufficiently densify the first carded layer such that a flow resistant skin can be produced in the subsequent molding operation. Once the product is processed through the needle loom it is wound into a roll good and transferred to a molding line. The total weight of the composite fabric is 41.4 ounces per square yard (1400 grams per square meter) and the thickness in this state is 0.315 to 0.475 inches (8.0 to 12.1 mm).

A second specific example of the present invention made from a two-layer product that utilizes one carding machine will now be described.

The first layer is composed of 2 different polyester fibers. The predominant fiber is a black polyester bicomponent with a sheath melting point of about 230° F. (110° C.). This fiber is 70% of the blend ratio. The second fiber in the first layer is a black polyester staple, and it is 30% of the blend. The two fibers are mixed to the above ratio by weight and then thoroughly opened and blended and introduced into a carding machine. The card produces a web that is carried by the cross-lapper which creates horizontal laps of the carded web. The number of horizontal laps is set so the total weight of this first layer is 7.0 ounces per square yard (237 grams per square meter) in the final needled composite. The first portion of the present invention is comprised entirely of the first carded layer.

Once the first layer is formed by the card and cross-lapper, it must be processed through the needle loom in order to stabilize the web structure. The first layer is needled equally from both sides similar to the first example, but with a lower needling density. The total needle density is 520 punches per square inch (81 punches per square meter). The first layer is then wound into a roll and stored for further processing.

The second carded layer is composed of 2 different polyester fibers. The predominant fiber in the second layer is a black polyester staple fiber, and it is 60% of the blend ratio. The second fiber in the second layer is a white polyester bicomponent with a sheath melting point of about 356° F. (180° C.), and it is 40% of the blend ratio. This fiber blend is processed through a similar carding operation as the first layer to produce a web with total weight of 28.4 ounces per square yard (963 grams per square meter) in the final needled composite for the second layer.

Prior to processing the second layer through the needle loom, the first layer, now in a roll form, is loaded into an unwind station and fed on top of the second layer. The first layer and the second layer are then fed simultaneously through the needle loom where they are needled together into a single composite fabric. The needle loom mechanically stitches the fibrous layers together so that they are sufficiently bonded together for handling and further processing through a molding operation. The composite fabric is needled from both sides at a total needle punch density of 596 punches per square inch (92 punches per square centimeter). The composite fabric has a weight of 35.4 ounces per square yard (1200 grams per square meter) and a thickness of 0.300 to 0.400 inches (7.6 to 10.2 mm).

The roll goods produced in examples 1 and 2 are then fed into conventional thermoforming processes such as described below. The fabric is fed into a blanking machine that cuts the fabric to a precise length. The pre-cut blank is then automatically fed into an oven where it is heated to a temperature that will allow it to be molded. The temperature of the composite fabric for the specific examples 1 and 2 is between 380° F. and 450° F. (193.3° C. and 232.2° C.) when it exits the molding oven. The operator removes the heated fabric from the oven and places it into a molding press. The mold tool in the press contains chilled water that circulates through the tool to keep it cool; preferable below 100° F. (37.8° C.). The fabric is molded in the tool until it is sufficiently chilled so as to permanently retain the required shape and proper thickness. In example 1, for a material weighing 41.4 ounces per square yard (1400 grams per square meter), the optimum thickness of the molded panel is 5 mm. In example 2, for a material weighing 35.4 ounces per square yard (1200 grams per square meter), the optimum thickness of the molded panel is 4.2 mm. The product is then transferred to a traditional trimming operation such as waterjet cutting or 3D die cutting to produce the final part shape and trim line for the application. These examples produce a molded and shaped acoustically insulating vehicle panel with high rigidity such that the part is self-supporting. Also, the first portion of the composite produces a substantially continuous, semi-impervious, densified skin integrally associated with and bonded to the surface of the second portion. The resulting density of the composite is 17.5 lbs/cubic foot (280 kg per cubic meter) for example 1 and 17.8 lbs/cubic foot (285 kg per cubic meter) for example 2. The resulting flow resistance of the composite is 750 MKS rayls for example 1 and 650 MKS rayls for example 2 which produces a high level of acoustic absorption as demonstrated in FIG. 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A molded and shaped acoustical insulating vehicle panel, comprising:
    a nonwoven fibrous composite having a first portion of greater than 60 to 80 percent meltable binder fibers and less than 40 percent to 20percent staple fibers, and having a second portion of about 20 to 50 percent meltable binder fibers and 50 to 80 percent staple fibers; and
    at least a portion of the meltable binder fibers of the first portion forming a substantially continuous, semi-impervious, densified skin integrally associated with and bonded to a surface of the first portion, wherein the densified skin is about 5 to about 20 percent of an overall thickness of the molded and shaped acoustical insulating vehicle panel,
    wherein the molded and shaped acoustical insulating vehicle panel has a density of from about 12 to 22 lbs/cubic foot (192 to 352 kg/cubic meter) over a predominance of an area defining the molded and shaped acoustical insulating vehicle panel, and is sufficiently rigid so as to be self-supporting.

2. The panel of claim 1, wherein the dry-laid and needled fibrous composite is carded.

3. The panel of claim 2, wherein the molded and shaped acoustical insulating vehicle panel has a density gradient from a back side to the skin side.

4. The panel of claim 1, wherein the skin of the molded and shaped acoustical insulating vehicle panel has a sufficient porosity so that water splashed thereinto may drain therefrom.

5. The panel of claim 4, wherein the molded and shaped acoustical insulating vehicle panel has the skin formed in a cool mold so as to cause melted and/or softened fibers to coalesce into the skin.

6. The panel of claim 1, wherein the molded and shaped acoustical insulating vehicle panel is in the form of a vehicle wheel well shield with a Flow Resistance of between 300 and 1000 MKS rayls.

7. The panel of claim 1, wherein the molded and shaped acoustical insulating vehicle panel is in the form of a vehicle wheel well shield with a Flow Resistance of between 350 and 800 MKS rayls.

8. The panel of claim 1, wherein the molded and shaped acoustical insulating vehicle panel is so self-supporting that it will retain its molded shape without supports.

9. A process for making the vehicle panel of claim 1, comprising:
    dry-laying a first portion of fibers having from about 50% to 80% meltable binder fibers and about 30% to 50% staple fibers;
    dry-laying a second portion of fibers on the first portion so as to form a composite thereof, with the second portion having about 20% to 50% meltable binder fibers and about 50% to 80% staple fivers;
    needling the composite sufficiently to form a consolidated composite;
    heating the consolidated composite to a temperature sufficient to soften and/or melt the meltable binder fibers such that the meltable binder fibers are moldable;
    molding the heated consolidated composite in a mold in the configuration of a vehicle panel until the meltable binder fibers resolidify such that at least some of the resolidified binder fibers of the first portion form a substantially continuous, semi-impervious, densified skin intimately adhered and bonded to the first portion and wherein the two portions have over a predominance of their area an insulation density of from about 12 to 22 lbs./cubic ft. (192 to 352 kg/cubic meter) and the molded panel is sufficiently rigid so as to be self-supporting.

10. The process of claim 9, wherein the consolidated composite is heated to a temperature of at least 300° F. (148.9° C.) and the mold is a cool mold with a temperature of no more than 200° F. (93.3° C.), so that the heated consolidated composite is shaped and cooled while in the mold and may be removed from the mold as a self supporting panel.

11. The process of claim 10, wherein the composite is needled with at least 300 needle punches per square inch (47 needle punches per square centimeter).

12. A molded and shaped acoustical insulating vehicle panel, comprising:
    a nonwoven fibrous composite having a first portion of greater than 60 to 80 percent meltable binder fibers and less than 40 percent to 20 percent staple fibers, and having a second portion of about 20 to 50 percent meltable binder fibers and 50 to 80 percent staple fibers;
    the composite having fibers from the first portion extending into the second portion and providing a high bond strength after molding between the first portion and the second portion to prevent peeling of the first portion from the second portion; and
    a substantially continuous, semi-impervious, densified skin comprising resolidified binder fibers of the first portion and being integrally associated with and bonded to a surface of the first portion, wherein the densified skin is about 5 to about 20 percent of an overall thickness of the molded and shaped acoustical insulating vehicle panel, and wherein the molded and shaped acoustical insulating vehicle panel has a density of from about 12 to 22 lbs/cubic foot (192 to 352 kg/cubic meter) over a predominance of an area defining the molded and shaped acoustical insulating vehicle panel, and the molded and shaped acoustical insulating vehicle panel is sufficiently rigid so as to be self-supporting.

13. The panel of claim 12, wherein the dry-laid composite is carded.

14. The panel of claim 13, wherein the molded and shaped acoustical insulating vehicle panel has a density gradient from a back side to the skin side.

15. The panel of claim 12, wherein the skin of the molded and shaped acoustical insulating vehicle panel has a sufficient porosity so that water splashed thereunto may drain therefrom.

16. The panel of claim 15, wherein the molded and shaped acoustical insulating vehicle panel has the skin formed in a cool mold so as to cause melted and/or softened fibers to coalesce into the skin.

17. The panel of claim 12, wherein the molded and shaped acoustical insulating vehicle panel is in the form of a vehicle wheel well shield with a Flow Resistance of between 300 and 1000 MKS rayls.

18. The panel of claim 12, wherein the molded and shaped acoustical insulating vehicle panel is in the form of a vehicle wheel well shield with a Flow Resistance of between 350 and 800 MKS rayls.

19. The panel of claim 12, wherein the molded and shaped acoustical insulating vehicle panel is so self-supporting that it will retain its molded shape without supports.

* * * * *